United States Patent
Beech, Jr. et al.

(10) Patent No.: US 7,414,166 B2
(45) Date of Patent: Aug. 19, 2008

(54) MINIMIZING CATALYST BACKFLOW IN FLUIDIZED BED REACTORS

(75) Inventors: James H. Beech, Jr., Kingwood, TX (US); Brian A. Cunningham, Ellicott City, MD (US); Christopher G. Smalley, Manassas, VA (US); Rathna P. Davuluri, Fairfax, VA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 641 days.

(21) Appl. No.: 10/958,803

(22) Filed: Oct. 5, 2004

(65) Prior Publication Data

US 2006/0073083 A1    Apr. 6, 2006

(51) Int. Cl.
  *C07C 1/00* (2006.01)
  *C10G 11/00* (2006.01)
  *F27B 15/08* (2006.01)

(52) U.S. Cl. .................. 585/638; 585/639; 585/640; 585/921; 585/923; 208/106; 208/113; 208/118; 208/120.01; 208/122; 422/139; 422/140; 422/141; 422/142; 422/143; 422/145; 422/146; 422/147

(58) Field of Classification Search ......... 585/638–640, 585/921, 923; 422/139–147; 208/106, 113, 208/118, 122, 120.01
  See application file for complete search history.

(56) References Cited

U.S. PATENT DOCUMENTS

| | | | |
|---|---|---|---|
| 3,001,931 A | 9/1961 | Osborne | 208/164 |
| 3,677,715 A * | 7/1972 | Morrison et al. | 422/145 |
| 4,486,617 A | 12/1984 | Hoelderich et al. | 585/640 |
| 4,503,281 A | 3/1985 | Hoelderich et al. | 585/640 |
| 4,753,721 A | 6/1988 | McDaniel et al. | 208/143 |
| 4,849,573 A | 7/1989 | Kaeding | 585/640 |
| 5,308,476 A | 5/1994 | Buttke et al. | 208/157 |
| 6,346,219 B1 | 2/2002 | Hedrick | 422/145 |
| 2004/0076554 A1 | 4/2004 | Kuechler et al. | 422/139 |

FOREIGN PATENT DOCUMENTS

| | | |
|---|---|---|
| DE | 3228668 | 2/1984 |
| DE | 40 37 252 | 10/1992 |
| EP | 16405 | 9/1980 |
| EP | 16406 | 10/1980 |
| EP | 116339 | 8/1984 |

(Continued)

OTHER PUBLICATIONS

Derwent Abstract for EP 16405, "Olefin Prodn. From Methanol and/or Dimethyl Ether—Using Zeolite Catalyst Contg. Iron Oxide", Oct. 1, 1980.

(Continued)

*Primary Examiner*—Glenn Caldarola
*Assistant Examiner*—In Suk Bullock

(57) ABSTRACT

This invention provides feed introduction devices, and processes for using same, which minimize catalyst clogging. In particular, the invention is to a feed introduction device having a first end in fluid communication with a feed source, a second end in fluid communication with a reactor and a deviation zone between the first end and the second end to deviate the flow of feed about a deviation angle from the first end toward the second end. According to the invention, the deviation angle is greater than 90 degrees.

29 Claims, 4 Drawing Sheets

FOREIGN PATENT DOCUMENTS

| | | |
|---|---|---|
| EP | 206360 | 12/1986 |
| GB | 716 242 | 9/1954 |
| WO | WO 01/77046 | 10/2001 |

OTHER PUBLICATIONS

Derwent Abstract for EP 116339, "Prepn. Of Lower Olefin(s) from Methanol—or Dimethyl Ether, on Non-Zeolite, Adsorptive Aluminosilicate Impregnated with Boric Acid", Aug. 22, 1984.

Derwent Abstract for DE 3228668, "Lower Olefin Prepn. From Methanol and/or Dimethyl Ether—Using Borosilicate Zeolite Catalyst Treated with Hydrogen Chloride after Deformation with Binder", Feb. 2, 1984.

U.S. Appl. No. 09/564,613, filed May 4, 2000 (Inventors-James Lattner, Jeffrey S. Smith, Nicolas P. Coute, and Keith Kuechler), entitled "Multiple Riser Reactor". (2000B023).

Derwent Abstract for EP 16406, "Olefin Prodn, From Methanol and/or Dimethyl Ether—Using Zeolite Catalyst Prepd. From Water-Glass with Hexamethylene Diamine", Oct. 1, 1980.

Derwent Abstract for EP 206360, "Boro-Silicate Zeolite Catalyst for Olefin Mfr. From Methanol or Ether—Made into Tablets or Strands Without Binder and Treated with Hydrochloric Acid", Dec. 30, 1986.

Derwent Abstract for JP 73020697, "Fluidised Bed Reactor—with Catalyst Retaining System", Sep. 22, 1973.

\* cited by examiner

MINIMIZING CATALYST BACKFLOW IN FLUIDIZED BED REACTORS

FIELD OF THE INVENTION

The present invention relates to feed introduction devices. More particularly, the invention relates to feed introduction devices that minimize catalyst clogging.

BACKGROUND OF THE INVENTION

Light olefins, defined herein as ethylene and propylene, serve as feeds for the production of numerous chemicals. Olefins traditionally are produced by petroleum cracking. Because of the limited supply and/or the high cost of petroleum sources, the cost of producing olefins from petroleum sources has increased steadily.

Oxygenates such as alcohols, particularly methanol, dimethyl ether, and ethanol, are alternative feedstocks for the production of light olefins. In an oxygenate to olefin (OTO) reaction system, an oxygenate in an oxygenate-containing feedstock contacts a molecular sieve catalyst composition, preferably in a fast-fluidized reaction system, under conditions effective to convert at least a portion of the oxygenate to light olefins, which are yielded from the reaction system in a reaction effluent.

Typical OTO reaction processes occur in fast-fluidized reaction systems. An oxygenate-containing feedstock enters a lower region of a riser reactor through one or more conduits. Upon entry into the riser reactor the oxygenate-containing feedstock flows in an upward direction in the riser reactor while contacting a catalyst composition. As the oxygenate contacts the catalyst composition, the oxygenate in the oxygenate-containing feedstock is converted to light olefins. One problem associated with conventional fast-fluidized reaction systems is that the catalyst particles contained in the riser reactor may backflow into the one or more feed introduction conduits, particularly during start up and/or shutdown operations. This backflow of catalyst can interfere with the operation of the feed introduction conduits when operation of the riser reactor resumes. Special shut down procedures can be followed in order to reduce or eliminate backflow of particles. However, such procedures may not be possible when an emergency dictates the timeframe of a shutdown. The agglomeration of the catalyst particles that results from catalyst backflow may protract startup time and, in some situations, require time consuming and expensive disassembly of equipment before operations may resume.

U.S. Pat. No. 6,346,219 addresses a similar problem that occurs in fluidized catalytic cracking (FCC) units. Specifically, the '219 Patent is directed to a fluid feed distributor which improves particle and feed contacting by using a flow actuated plug to prevent backflow of fluidizable particles through a fluid feed outlet when fluid feed to a riser conduits ceases.

Japanese Patent No. 73020697B similarly provides a tap on a riser, which falls down in the case of no fluid feed thereby closing the riser and shutting down the connection of the feeding zone with the fluidization zone. An advantage of this invention is that it allows intimate contacting while protecting the backflow of catalyst particles into a fluid reactant feed pipe from the fluidization reaction vessel.

While various apparatus and processes have been provided in the prior art, the need exists for additional processes and devices for reducing the backflow of catalyst particles into a catalyst feed conduit, particularly in OTO reaction systems.

SUMMARY OF THE INVENTION

The present invention provides feed introduction devices and processes for using same which minimize catalyst clogging, particularly during shutdown and startup operations. In one embodiment, the invention is to a feed introduction device, which includes a first end in fluid communication with a feed source, optionally comprising a feed header, a second end in fluid communication with a reactor, and a deviation zone between the first end and the second end to deviate a flow of feed about a deviation angle from the first end toward the second end. The deviation angle is greater than 90 degrees, preferably greater than 90 degrees and less than 360 degrees, more preferably greater than 130 degrees and less than 170 degrees, and most preferably greater than 140 degrees and less than 160 degrees.

In one embodiment, the reactor has an outer wall and the feed introduction device forms a feed introduction angle with the outer wall. The feed introduction angle preferably ranges from about 15 degrees to about 90 degrees, preferably from about 20 degrees to about 45 degrees, and most preferably from about 25 degrees to about 35 degrees.

In one embodiment, the feed introduction device is formed of a substantially tubular member that curves about the deviation angle.

Optionally, the feed introduction device further includes a feed inlet zone having a first distal end and a first proximal end, wherein the first distal end is in fluid communication with the feed source and the first proximal end is in fluid communication with the deviation zone. Optionally, the feed inlet zone extends in a direction substantially perpendicular to grade. Additionally or alternatively, the feed introduction device further includes a feed outlet zone having a second proximal end and a second distal end, wherein the second proximal end is in fluid communication with the deviation zone and the second distal end is in fluid communication with the reactor. Optionally, the feed outlet zone further comprises a second deviation zone.

Optionally, the feed introduction device further includes a region of increasing cross sectional area, with respect to the direction the feed normally flows through the feed introduction device. The region of increasing cross sectional area preferably increases from a first cross sectional area to a second cross sectional area, the ratio of the second cross sectional area to the first cross sectional area being greater than 1.0, more preferably greater than about 2.0, and most preferably greater than about 4.0.

Optionally, the feed introduction device further includes one or more valves to minimize the backflow of catalyst into the feed source. The valve may be situated within one or more of: the feed inlet zone, the deviation zone and/or the feed outlet zone. The valve optionally is selected of the group consisting of a check valve, a swing check valve, a lift check valve, a tilting disk check valve, a ball check valve and a control valve.

Optionally, the feed introduction device further includes a purge gas introduction line to add a purge gas into the feed introduction device. The purge gas introduction line preferably is a fluid communication with a purge gas source. The purge gas introduction line optionally is in fluid communication with one or more of: the feed inlet zone, the deviation zone and/or the feed outlet zone.

Preferably, the reactor comprises and oxygenates to olefin (OTO) reactor. The reactor preferably comprises a fluidized bed reactor.

In another embodiment, the invention is directed to a process for introducing a feed into a reactor from a feed introduction device having a first end, a second end and deviation zone. The process includes the steps of: (a) receiving a flow of feed into the first end of the feed introduction device from a feed source; (b) deviating the flow of feed in the deviation zone about a deviation angle from the first end toward the second end, wherein the deviation angle is greater than 90 degrees; and (c) releasing the feed from the second end of the feed introduction device and into the reactor. The deviation angle optionally is greater than 90 degrees and less than 360 degrees, more preferably greater than 130 degrees and less than 170 degrees, and most preferably greater than 140 degrees and less than 160 degrees.

In this embodiment, the reactor has an outer wall and the feed introduction device preferably forms a feed introduction angle with the outer wall of from about 15 degrees to about 90 degrees, preferably from about 20 degrees to about 45 degrees, and most preferably from about 25 degrees to about 35 degrees. In one embodiment, the feed introduction device further comprises a feed inlet zone having a first distal end and a first proximal end, the process further including the step of directing the flow of feed through the feed inlet zone between steps (a) and (b). Optionally, the feed inlet zone extends in a direction substantially perpendicular to grade. Additionally or alternatively, the feed introduction device further comprises a feed outlet zone having a second proximal end and a second distal end, the process further including the step of directing the flow of feed through the feed outlet zone between steps (b) and (c). Optionally, the feed outlet zone comprises a second deviation zone and the process further comprises the step of deviating the flow of feed about a second deviation angle as it passes through the second deviation zone.

Optionally, the feed introduction device has a region of increasing cross sectional area, with respect to the direction the feed normally passes through the feed introduction device. The region of increasing cross sectional preferably increases from a first cross sectional area to a second cross sectional area, the ratio of the second cross sectional area to the first cross sectional area being greater than 1.0, preferably greater than about 2.0, and most preferably greater than about 4.0. The region of increasing cross sectional area may be situated on one or more of: the feed inlet zone, the deviation zone and/or the feed outlet zone. In one embodiment, the flow of feed has a first superficial velocity in the feed inlet zone and a second superficial velocity in the feed outlet zone, the second superficial velocity being less than the first superficial velocity. Thus, the process optionally includes the step of decreasing the superficial velocity of the feed as it passes through the region of increasing cross sectional area from the first superficial velocity to the second superficial velocity.

Optionally, backflow of catalyst into the feed source is minimized by a valve. The valve optionally is situated on one or more of the feed inlet zone, the deviation zone or the feed outlet zone. The valve optionally is selected from the group consisting of a check valve, a swing check valve, a list check valve, a tilting disk check valve, a ball check valve and a control valve.

Optionally, the process of the present invention further includes the step of monitoring the flow of feed through the feed introduction device with a flow detector situated between the first distal end of the feed inlet zone and a control valve. Preferably, the process further includes the step of closing the control valve responsive to a determination in the monitoring step that the flow of feed has fallen below a predetermined level. Additionally or alternatively, the process further include the step of opening a purge gas introduction valve to allow purge gas into the feed introduction device.

The opening step preferably is responsive to a determination in the monitoring step that the flow of feed has fallen below a predetermined level. Optionally, the purge gas is introduced into one or more of: the feed inlet zone, the deviation zone and/or the feed outlet zone.

BRIEF DESCRIPTION OF THE DRAWINGS

The present invention will be better understood with reference to the attached figures, wherein.

DETAILED DESCRIPTION OF THE INVENTION

A. Introduction

Figure 1:
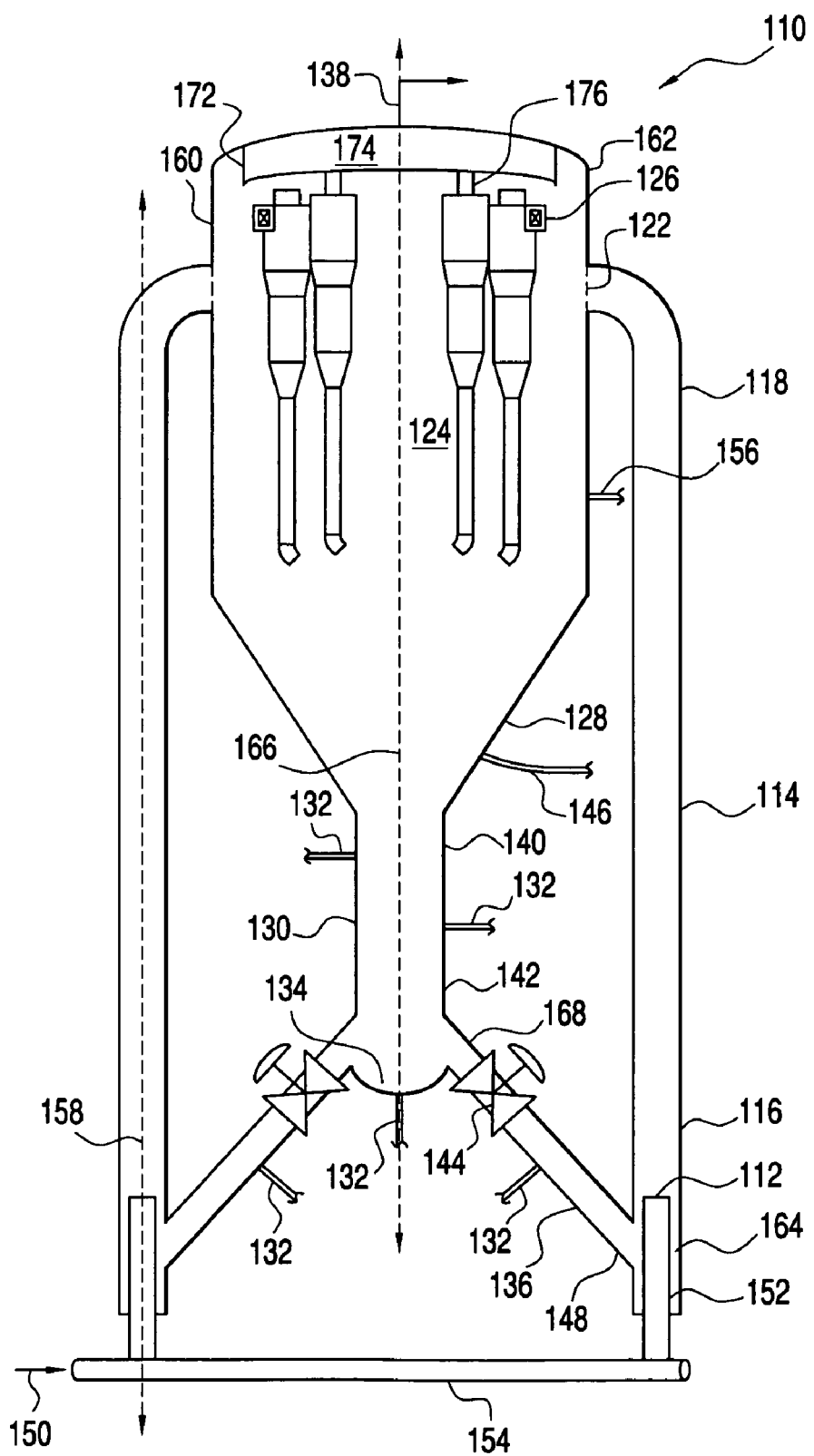
FIG. 1 presents partial cross-sectional view of a hydrocarbon conversion apparatus having feed introduction devices.

The present invention provides for a feed introduction device, and processes for using same, which minimize the occurrence of catalyst backflow and clogging. The feed introduction device of the present invention is ideally suited for fluidized reactors and particularly fast-fluidized riser reactors. In particular, the invention is to a feed introduction device having a first end in fluid communication with a feed source, a second end in fluid communication with a reactor and a deviation zone between the first and the second end to deviate the flow of feed about a deviation angle from the first end toward the second end. Ideally, the deviation angle is greater than 90 degrees. By implementing a feed introduction device having a deviation angle greater than 90 degrees, a trap can be created to advantageously capture the backflowing catalyst thereby minimizing or eliminating catalyst backflow into the feed source.

B. The Feed Introduction Device

The present invention is directed to a feed introduction device and processes for using same, which minimize catalyst backflow and clogging, particularly during reactor shutdown and startup operations. In one embodiment, the invention is to a feed introduction device which includes a first end in fluid communication with a feed source, a second end in fluid communication with a reactor, and a deviation zone between the first end and the second end to deviate a flow of feed about a deviation angle from the first end toward the second end. A "deviation angle" for purposes of the present specification and the appended claims means the angle about which the flow of feed is deviated as it travels through a deviation zone. The deviation angle is greater than 90 degrees, preferably greater than 90 degrees and less than 360 degrees, more preferably greater than 130 degrees and less than 170 degrees and most preferably greater than 140 degrees and less than 160 degrees. The deviation angle preferably is about 150 degrees. The feed introduction device optionally comprises a plurality of deviation zones and, correspondingly, a plurality of deviation angles.

In a fast-fluidized reaction system, catalyst particles typically travel in an upward direction during normal operating conditions. As the flow of feed decreases in a fast-fluidized reaction system, the superficial velocity of the catalyst in the reaction system correspondingly decreases. As a result, the fluidized catalyst may begin to travel in a downward direction as the gravity effects exceed the fluidization effects. The falling catalyst particles may enter the outlet of one or more feed introduction devices. In conventional systems, the catalyst that enters the feed introduction devices may cause a blockage therein, requiring cleaning of the feed introduction devices. Catalyst may backflow to the feed source necessitating expensive disassembly to remove the catalyst therefrom.

The deviation zone of the feed introduction device of the present invention acts as a trap to minimize or prevent the amount of catalyst backflow into the feed source. As catalyst backflows into the feed introduction device of the present invention, the catalyst will tend to settle at the proximally-extreme point of the deviation zone. The trapped catalyst will effectively create a controlled blockage in the deviation zone, thereby advantageously minimizing or preventing catalyst backflow into the feed source. Upon reactor start up, the catalyst trapped in the deviation zone may be expelled by introducing a purge gas stream into the feed introduction device at a point upstream of the catalyst trapped in the deviation zone. Additionally or alternatively, the flow of feed at reactor start up may be sufficient to expel the catalyst from the deviation zone. Additionally or alternatively, the deviation zone may comprise an openable drain, which may be opened to remove the catalyst from the deviation zone. After catalyst removal, the drain is closed and the flow of feed is gradually increased to operating conditions.

In one embodiment, the reactor has an outer wall and the feed introduction device forms a feed introduction angle with the outer wall. As used herein, a "feed introduction angle" is an acute angle formed between the outer wall of a reactor and the feed introduction device. The feed introduction angle preferably ranges from about 15 degrees to about 90 degrees, preferably from about 20 degrees to about 45 degrees, and most preferably from about 25 degrees to about 35 degrees. The feed introduction angle preferably is about 30 degrees.

Optionally, the feed source comprises a feed header. A feed header comprises a manifold, which receives feed from one or more main feed lines and preferably delivers the feed to multiple conduits for communication thereof to multiple feed introduction devices. In a preferred embodiment one or more feed headers surround a single reactor in a substantially circular manner, and the one or more feed headers deliver the feed from one or more main feed lines to a plurality of feed introduction devices situated around the reactor. In another embodiment, the feed source comprises a feed distributor comprising single or multiple feed lines or conduits initiating from a feed vaporizer, a feed preheat exchanger or furnace, or a feed drum containing either vapor or liquid or a mixture of vapor and liquid, the feed lines or conduits terminating at a feed header.

In one embodiment, the feed introduction device is formed of a substantially tubular number that curves about the deviation angle. It is contemplated, however, that the cross sectional shape of the conduit may be oval, square, hexagonal, or any other shape as well as circular. The feed introduction device may be formed of one or more of a variety of different materials well known in the art to be suitable as feed introduction conduits. Preferably, the feed introduction device is formed, at least in part, of carbon steel or various steel alloys that may be lined or unlined and that are compatible with the feed composition and conditions.

Optionally, the feed introduction device further includes a feed inlet zone, which is typically formed of a substantially tubular member. The feed inlet zone is a conduit for directing the feedstock from the feed source to the deviation zone. Thus, the feed inlet zone has a first distal end and a first proximal end, wherein the first distal end is in fluid communication with the feed source and the first proximal end is in fluid communication with the deviation zone. Optionally, the feed inlet zone extends in a direction substantially perpendicular to grade. For purposes of the present specification and appended claims, the "proximal direction" is a direction extending toward grade and the "distal direction" is a direction extending away from grade. Thus, the "proximal end" of a specified object is the end of the object that is closest to grade, and the "distal end" of a specified object is the end of the object that is farthest from grade. "Grade" refers to where a reactor meets the foundation of the supports for the reactor. Typically, a reactor will extend in a direction substantially normal to grade. As used herein, the terms "feed" and "feedstock" are synonymous with one another and are interchangeably used to refer to a composition that is fed to a reaction system and which comprises one or more reactants and optionally one or more non-reactive components such as, but not limited to, one or more diluents. The term "downstream," as used herein, refers to the direction the feed travels through the feed introduction device during normal operating conditions; the term "upstream" refers to the direction opposite the direction the feed travels through the feed introduction device during normal operating conditions.

Additionally or alternatively, the feed introduction device further includes a feed outlet zone, which also is typically formed of a substantially tubular member. The feed outlet zone is a conduit for directing the feedstock from the deviation zone to the reactor. Thus, the feed outlet zone has a second proximal end and a second distal end, wherein the second proximal end is in fluid communication with the deviation zone and the second distal end is in fluid communication with the reactor.

Optionally, the feed introduction device further includes a region of increasing cross sectional area with respect to the direction the feed flows through the feed introduction device. The region of increasing cross sectional area preferably increases from a first cross sectional area to a second cross sectional area, the ratio of the second cross sectional area to the first cross sectional area being greater than 1.0, more preferably greater than about 2.0, and most preferably greater than about 4.0.

By providing a region of increasing cross sectional area in the feed introduction device according to the present invention, a superficial velocity differential can be created as the feedstock passes through the feed introduction device. In this embodiment, the flow of feed upstream of the region of increasing cross sectional area has a first superficial velocity and the flow of feed downstream of the region of increasing cross sectional area has a second superficial velocity, which is less than the first superficial velocity. During operation, the greater first superficial velocity tends to hinder the backflow of catalyst into the flow of feed that is upstream of the region of increasing cross sectional area. As a result, catalyst backflow into the feed source can be advantageously minimized. In one embodiment, the flow of feed has a first superficial velocity in the feed inlet zone and a second superficial velocity in the feed outlet zone, the second superficial velocity being less than the first superficial velocity. In this latter embodiment, the region of increasing cross sectional area optionally is situated between the feed inlet zone and the feed outlet zone, although it is contemplated that the region of increasing cross sectional area may be situated within the feed inlet zone and/or the feed outlet zone.

Optionally, the feed introduction device further includes a valve to minimize back flow of catalyst into the feed source. The optional valve may be situated on one or more of: the feed inlet zone, the deviation zone and/or the feed outlet zone. The valve optionally is selected of the group consisting of a check valve, a swing check valve, a lift check valve, a tilting disk check valve, a ball check valve and a control valve. If the valve comprises a check valve (any of the above check valve types), as the flow of the feedstock decreases, for example during reactor shutdown, the pressure of the feedstock against the valve will decrease, causing the check valve to close. The closing of the check valve preferably further minimizes the backflow of catalyst into the feed source.

The above-described check valves open and close automatically according to pressure differentials created in the feed introduction device. In another embodiment, the feed introduction device additionally or alternatively comprises an actuatable valve, such as a control valve. In this embodiment, the feed introduction device optionally further comprises a flow detector situated between the first distal end of the feed inlet zone and the valve. Upon detecting a decrease in the flow of the feedstock across the flow detector (e.g., below a pre-selected feed pressure value), the flow detector activates an actuator to cause the control valve to close. Conversely, as the flow of the feedstock across the flow detector increases, for example during reactor start up, the flow detector activates the actuator to cause the control valve to open. Ideally, the conditions, e.g., flow pressure, for opening and closing the one or more control valves are selected based on the flow characteristics of the catalyst utilized in the reaction system so as to minimize the backflow of catalyst upstream of the control valve.

In one embodiment, the feed introduction device further includes a purge gas introduction line to add a purge gas into the feed introduction device. The purge gas introduction line preferably is a fluid communication with a purge gas source. The purge gas introduction line optionally is in fluid communication with one or more of: the feed inlet zone, the deviation zone and/or the feed outlet zone. Preferably, the purge gas introduction line is upstream of the deviation zone. As the flow of feed decreases, for example during reactor shut down operations or other feed outage (for example, due to a power failure), the flow of purge gas to the feed introduction device can be increased to further prevent the backflow of catalyst.

Another benefit of purge gas embodiment according to the present invention is that it minimizes the amount of unnecessary diluent added to the reaction system. In some systems, diluent may be continuously added to a reactor in addition to feed. The amount of diluent added can be increased to make up for a corresponding decrease in the amount of feed that is fed to the reactor. As a result, a constant superficial velocity can be maintained in the reactor and catalyst backflow can be minimized notwithstanding a drop off in the feed flow rate. This process, however, may be undesirable because the diluent can represent 11 vol. % or greater of the vapor exiting the reactor. Thus, the diluent takes up room in the reactor that could be better used for reactant and, in fact, may effectively result in the implementation of an additional riser in the reactor that would not be needed if the diluent was removed or eliminated. Table 1, below, shows the calculated (prophetic) impact of eliminating the diluent on the reactor exit flow rate and number of risers required. The diluent maintains a minimum feed nozzle velocity of about 30 ft/sec (9 m/sec) on total loss of feed flow.

TABLE I

|  | Without Diluent | With Diluent |
| --- | --- | --- |
| Riser Outlet T (° C.) | 493 | 493 |
| Feed Nozzle Purge Steam | NO | YES |
| Number of Risers | 4 | 5 |
| Reactor Outlet Rate (m³/s) | 211 | 235 |
| % Δ in Reactor Exit Flow | — | +11 |

FIG. 1 illustrates a partial cross sectional view of a hydrocarbon conversion apparatus (HCA), generally designated 110, having a conventional feed introduction device. See U.S. patent application Ser. No. 09/564,613, filed May 4, 2000, and U.S. patent application Ser. No. 10/338,601, filed Jan. 8, 2003, the entireties of which are incorporated herein by reference.

The HCA 110 comprises a shell 160, a separation zone 124, a plurality of riser reactors 114, a feed distributor 154 (feed source), and a catalyst return 130. With continuing reference to FIG. 1, the shell 160 defines the separation zone 124 in which a product of the hydrocarbon conversion reaction is separated from the catalyst, which catalyzes the hydrocarbon conversion reaction. Shell 160 and separation zone 124 include a first end 162 and a second end 128. The separation zone 124 preferably includes one or more separation devices 126, which are used to separate the products from the catalyst. The separation devices 126 may be cyclonic separators, filters, screens, impingement devices, plates, cones or any other device, which would separate the catalyst from the product of the conversion reaction. The separation devices 126 shown in FIG. 1 are cyclonic separators. In other embodiments, not illustrated, the separation devices are positioned externally to the separation zone 124, outside of the shell defining the separation zone 124, or a combination of externally and internally positioned separation devices.

In the HCA shown in FIG. 1, riser reactors 114 extend adjacent to shell 160 and the separation zone 124. Each riser reactor 114 includes a first end 116 into which the catalyst and feed are fed to conduct the hydrocarbon conversion reaction. Each riser reactor 114 further includes a second end 118 through which the catalyst, products and unreacted feed, if any, exit the riser reactor 114 and enter the separation zone 124. If the riser reactor 114 is a cylindrical form, as shown in FIG. 1, a center axis 158 extends between the first end 116 and the second end 118. If the riser reactor lacks a central axis, e.g., is not cylindrical, conical, etc., a centroid line perpendicular to a cross-sectional plane of the riser reactor extends between the first and second ends. Preferably, the separation zone 124 is a cylindrical form having a center axis 166, which is preferably parallel to the center axis 158 of riser reactors 114. The first end 116 of each riser reactor 114 terminates in a mouth 164 through which the catalyst is fed into the riser reactor 114. The number of riser reactors 114 employed in the HCA 110 varies depending on the hydrocarbon conversion process to be conducted in the apparatus 110. The apparatus 110 can contain two, three, four, five, six or even more than six riser reactors 114.

The geometry of the riser reactors 114 may vary widely. In the embodiment in FIG. 1, the geometry is comprised of a cylindrical member. Optionally, the geometry of the riser reactors is comprised of a single, right frustum of a cone. Other suitable geometric shapes include, but are not limited to, triangular prisms and frusta of pyramids, rectangular and square wedges and frusta of pyramids, and pentagonal, hexagonal, septagonal and octagonal prismatoids and frusta thereof, general and right. Further non-limiting examples include various polyhedrons, such as a tetrahedron, an octohedron, a dodecahedron or an icosahedron, and conical spheres and spherical sectors, and torus and barrels in their circular, elliptical or parabolic forms, and frusta thereof, general and right. Multiple occurrences of any of these geometric shapes defining the riser reactor and/or the associated separation zone are also possible.

In the HCA illustrated in FIG. 1, a plurality of riser reactors 114 are oriented externally to the shell 160. Alternatively, riser reactors 114 are positioned directly underneath separation zone 124. In one embodiment, the riser reactors 114 are positioned adjacent to separation zone 124. In this embodiment, the second ends 118 of each riser reactor 114 enter separation zone 124 above the second end 128 of separation zone 124.

The size of the riser reactors 114 depends on parameters such as superficial velocity, solids hydrodynamics, pressure, and production capacity of the desired hydrocarbon conversion process. In the present invention, each riser reactor 114 desirably has a height from 10 meters to 70 meters and a width (or diameter) of one meter to three meters. All of the riser reactors 114 have a similar height from their first ends 116 through their second ends 118.

In one embodiment, to provide a feed to the riser reactors 114, at least one feed distributor 154 (feed source) is positioned near the first ends 116 of the riser reactors 114. The feed distributor 154 receives a feed stream from a feed providing line 150 and directs the feed to one or more of the riser reactors 114. In another embodiment, not shown, more than one feed distributor 154 is employed adjacent the first ends 116 of the riser reactors 114 to provide feed in various states, e.g., one feed distributor may provide feed in a vapor form while a second feed distributor may provide feed in a liquid form. Each feed distributor 154 includes a body from which a plurality of feed introduction devices or necks 152 extend. Each riser reactor 114 has at least one associated neck 152. Each neck 152 terminates in a head 112. Each head 112 of each neck 152 is positioned adjacent to the first end 116 of each riser reactor 114. Each head 112 extends upwardly into each riser reactor 114. More desirably, each head 112 is positioned at or above the mouth 164 at the first end 116 of each riser reactor 114. Feed distributor 154 may include an optional flow control device, not shown, positioned on feed distributor 154 to control the amount of feed to each neck 152 or a flow control device may be positioned on each neck 152. The flow control device can also be employed to measure flow as well as control it. Further, a nozzle, not shown, may be positioned on each head 112 to further control the distribution of the feed to each riser reactor 114. Additionally, each head 112 may be fitted with a screening, plunger or other device, not shown, to prevent backflow of catalyst into any of necks 152 of feed distributor 154.

At least one catalyst return 130 provides fluid communication between the separation zone 124 of shell 160 and the riser reactors 114. The apparatus 110 may include one, two, three, four, five, six or more catalyst returns 130, although only a single catalyst return 130 is illustrated in FIG. 1. If a plurality of catalyst returns are desired, each of the catalyst returns preferably is adapted to deliver catalyst from the separation zone directly to each of the respective riser reactors. In the embodiment shown, a single catalyst return 130, which is centrally oriented with respect to the riser reactors 114, is used. In this embodiment, the single catalyst return is in fluid communication with a plurality of arms 136. The catalyst return 130 has a first end 140 and a second end 142. The first end 140 of the catalyst return 130 opens into the second end 128 of shell 160 and the second end 142 of catalyst return 130 opens to a series of arms 136 adapted to deliver catalyst to the first ends 116 of riser reactors 114.

The arms 136 extend from the catalyst return 130 to each of the riser reactors 114 and provide fluid communication between the catalyst return 130 and the riser reactors 114. Each arm includes a first end 168 adjacent a catalyst retention zone 134 and catalyst return 130, and a second end 148 adjacent the riser reactor 114. Catalyst flows through each arm 136 from the first end 168 to the second end 148. The number of arms 136 preferably will correspond to the number of riser reactors 114 with each riser reactor having at least one corresponding arm 136. Flow of catalyst through the catalyst return 130 optionally is controlled through the use of flow control device(s) 144 positioned on the catalyst return 130 and/or on each arm 136. The flow control devices may be any type of flow control devices currently in use in the art to control catalyst flow through catalyst transfer lines. If employed, the flow control device 144 is desirably a ball valve, a plug valve or a slide valve.

In the embodiment shown in FIG. 1, the second end 142 of the catalyst return 130 and the arms 136 define a catalyst retention zone 134. The arms 136 open to the catalyst retention zone 134. The catalyst retention zone 134 is provided to retain catalyst, which is used to catalyze the hydrocarbon conversion reaction, which is conducted in the apparatus 110. As one of skill in the art will appreciate, the boundary between the catalyst retention zone 134 and the catalyst return 130 is fluid and depends, at least in part, on the level of catalyst contained in the catalyst retention zone 134 and the arms 136.

At least one fluidizing agent distributor 132 is positioned beneath the catalyst retention zone 134. The fluidizing agent distributor 132 includes a conduit into which a fluidizing agent is fed to fluidize a fluidizable catalyst in the catalyst retention zone 134 and the catalyst return 130. Additional fluidizing agent distributors 132, as shown in FIG. 1, may also be positioned on the catalyst return 130 and/or on one or more of the arms 136 to further fluidize catalyst contained therein. Optionally, the catalyst retention zone 134 includes a disperser, not shown, positioned in the catalyst retention zone and provided to disperse the fluidizing agent in the catalyst retention zone to facilitated fluidization of the catalyst therein. For example, the disperser could be a device selected from the group consisting of a grid, a screen and a perforated plate.

The HCA 110 may also include an outlet and outlet line 146 through which the catalyst is removed from the apparatus 110, e.g., for catalyst regeneration. The outlet line 146 is shown as being positioned on the second end 128 of the shell 160 but may be positioned at any position on the apparatus 110. Thus, the hydrocarbon conversion apparatus 110 of the present invention optionally includes an associated catalyst regeneration apparatus, not shown. The catalyst regeneration apparatus is in fluid communication with the hydrocarbon conversion apparatus 110. The catalyst regeneration apparatus includes a catalyst regenerator, which is in fluid communication with the hydrocarbon conversion apparatus 110, and an optional catalyst stripper, not shown, which is in fluid communication with the catalyst regenerator and which is in fluid communication with the hydrocarbon conversion apparatus 110. A first line, shown in part by outlet line 146, provides fluid communication between the catalyst stripper and the outlet on shell 162. A second line, not shown, provides fluid communication between the catalyst stripper and the catalyst regenerator. A third line, shown in part as inlet line 156, provides fluid communication between the catalyst regenerator and the inlet on shell 160. A flow control device, not shown, optionally is positioned on first line to control the flow of catalyst between the shell 160 and the catalyst stripper. Additionally or alternatively, a flow control device, not shown, is positioned on the second line to control the flow of catalyst between the catalyst stripper and the catalyst regenerator. Additionally or alternatively, a flow control device, not shown, is positioned on the third line to control the flow of catalyst between the catalyst regenerator and the shell 160. The flow control devices may be any types of flow control devices currently in use in the art to control catalyst flow through catalyst transfer lines. Useful flow control devices include ball valves, plug valves and slide valves. The catalyst stripper optionally is separate from or integrally formed with the catalyst regenerator. The third line can return catalyst to any portion of the HCA 110. For example, in various embodiments, catalyst is returned to the separation zone 124, as shown in FIG. 1, to the catalyst return 130, the catalyst retention zone 134, the arms 136, directly to riser reactor 114, or any combinations thereof.

The apparatus 110 shown in FIG. 1 functions in the following manner. The apparatus 110 is filled with an appropriate amount of catalyst suitable to carry out the desired hydrocarbon conversion reaction. The catalyst should be of a type that is fluidizable. At least a portion of the catalyst is retained in the catalyst return 130 and the catalyst retention zone 134. The catalyst is fluidized in the catalyst return 130 and the catalyst retention zone 134 by means of a fluidizing agent, which is provided to the hydrocarbon conversion apparatus 110 through the conduits of the fluidizing agent distributors 132. Useful fluidizing agents include, but are not limited to, inert gasses, nitrogen, steam, carbon dioxide, hydrocarbons and air. The choice of fluidizing agent depends upon the type of conversion reaction being conducted in the HCA 110. Desirably the fluidizing agent is unreactive, e.g., inert, in the reaction being conducted in the HCA 110. In other words, it is desirable that the fluidizing agent does not play a part in the hydrocarbon conversion process being conducted in the HCA 110 other than to fluidize the fluidizable catalyst.

Once the catalyst has reached an acceptable fluidized state, a feed is fed into the HCA 110 through feed distributor 154. The feed enters the body of feed distributor 154, passes through the necks 152 of feed distributor 154 and exits through the heads 112 of feed distributor 154. The feed is distributed to each of the riser reactors 114 through their first ends 116.

A pressure differential created by the velocity of the feed entering the first ends 116 of the riser reactors 114 and the pressure of the height of fluidizable catalyst in the catalyst return(s) 130 and the catalyst retention zone 134 causes catalyst to be aspirated into the first ends 116 of the riser reactors 114. The catalyst is transported through the riser reactors 114 under well known principles in which the kinetic energy of one fluid, in this case the feed, is used to move another fluid, in this case the fluidized catalyst. The catalyst and feed travel from the first ends 116 to the second ends 118 of the riser reactors 114. As the catalyst and feed travel through the riser reactors 114, the hydrocarbon conversion reaction occurs and a conversion product is produced. The flow of catalyst to the riser reactors 114 are controlled by the flow control devices 144.

Each riser reactor 114 shown in FIG. 1 also comprises a deviating member adjacent the second end 118 thereof for deviating the flow of feed towards the separation zone 124. The conversion product(s), unreacted feed, if any, and the catalyst exit the riser reactors 114 through their second ends 118 and enter the deviating member. The deviating member preferably is a curved pipe, elbow, or other conduit device adapted to receive catalyst, products and unreacted feed, if any, that exits riser reactor 114 through second end 118. The deviating member deviates the flow of the catalyst, products and unreacted feed from the second end of the riser reactor 114 toward inlet 122 on the side wall(s) of separation zone 124. The conversion product(s), unreacted feed, if any, and catalyst then enters the separation zone 124 of shell 160. In the separation zone 124, the conversion product and unreacted feed, if any, are separated from the catalyst by a separation devices 126, such as cyclonic separators, filters, screens, impingement devices, plates, cones, other devices that would separate the catalyst from the product of the conversion reaction, and combinations thereof. Desirably, as shown in FIG. 1, the conversion product and unreacted feed, if any, are separated by a series of cyclonic separators. Once the catalyst has been separated from the conversion product and the unreacted feed, if any, the conversion products and unreacted feed, if any, are removed from the shell 160 through the product exit line 138 for further processing such as separation and purification.

Product exit conduit or conduits 176 from separation device(s) 126 is openly joined to a plenum shell 172. Plenum volume 174 is formed within the boundaries of plenum shell 172 as joined to the section of the shell 160 defining the top of separation zone 124. The plenum shell 172 and plenum volume 174 are provided to collect reaction product and possibly unreacted feedstock exiting separation devices 126 via product exit conduit or conduits 176, and direct that material to product exit line 138. The product exit line 138 is openly joined to separation zone 124 in the vicinity of plenum volume 174, and is provided to convey reaction product and possibly unreacted feedstock away from the apparatus. Such plenum designs are particularly useful in embodiments when a plurality of separation devices are utilized, for example as disclosed in FIG. 1. As shown, the product exit conduits 176 from the separation devices 126 are openly joined to the plenum shell 172, and a single, secondary product exit line 138 may be used to carry product away from the hydrocarbon conversion apparatus.

The catalyst, after being separated from the products and unreacted feed, moves from the shell 160 to catalyst return 130 and the catalyst retention zone 134. The catalyst exits shell 160 through the first end 140 of the catalyst return 130 and moves through the catalyst return 130 to the second end 142 of the catalyst returns 130 from which the catalyst moves to the optional catalyst retention zone 134. If desired, the flow of catalyst through the catalyst returns 130 is controlled by the flow control devices 144. If the flow control devices 144 are employed, a height of fluidizable catalyst is maintained above each flow control device 144 in the catalyst return 130 to allow proper function of the flow control device 144.

As discussed above, if necessary or desired, at least a portion of the catalyst is circulated to the catalyst regeneration apparatus. Catalyst to be regenerated is removed from the shell 160 through the outlet and outlet line 146 and transported, if desired, to the catalyst stripper. Optionally, the flow of catalyst between the hydrocarbon conversion apparatus 110 and the catalyst stripper is controlled by a flow control device, not shown. In the catalyst stripper, the catalyst is stripped of most of readily removable organic materials (organics). Stripping procedures and conditions for individual hydrocarbon conversion processes are within the skill of a person of skill in the art. The stripped catalyst is transferred from the catalyst stripper to the catalyst regenerator through a second line, not shown. The flow of catalyst through the second line optionally is controlled by one or more flow control devices. In the catalyst regenerator, carbonaceous deposits formed on the catalyst during a hydrocarbon conversion reaction are at least partially removed from the catalyst. The regenerated catalyst is then transferred to the shell 160 of the hydrocarbon conversion apparatus 110 through a third line. The flow of catalyst through the third line optionally is controlled by one or more flow control device. A transport gas is typically provided to the third line to facilitate transfer of the catalyst from the catalyst regenerator to the hydrocarbon conversion apparatus 110. The catalyst is returned to the shell 160 through the inlet 156.

In operation, the orientation of the feed introduction devices (necks 152) as well as the feed source (feed distributor 154) illustrated in FIG. 1 may become clogged with catalyst, particularly during HCA shut down. As the flow of feed through feed distributor 154 and necks 152 decreases during reactor shut down, the upward flow of the feed in riser reactors 114 decreases, ultimately, to a point where the gravitational effects on the catalyst particles contained in the riser reactors tends to direct the catalyst particles in a downward direction. Some of these catalyst particles will enter the head 112 of the necks 152 and settle therein. Some of the catalyst particles also may enter the feed distributor 154. This accumulation of catalyst in the necks 152 and the feed distributor 154 is problematic as it may clog these devices necessitating time consuming disassembly and cleaning.

Figure 2:
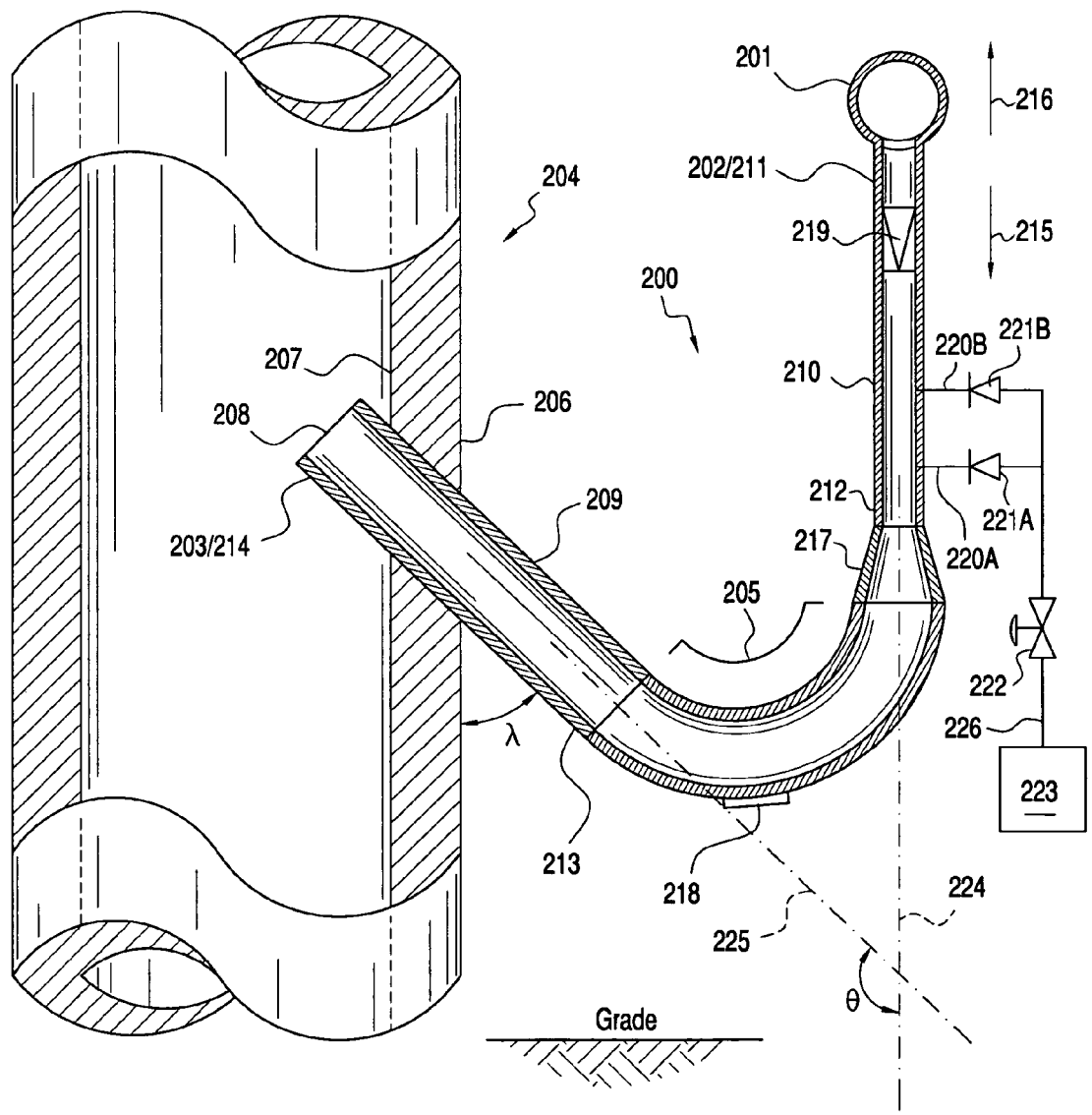
FIG. 2 presents a feed introduction device according to one embodiment of the present invention.

FIG. 2 illustrates one embodiment of the present invention which reduces catalyst backflow into the feed source. Specifically, FIG. 2 illustrates a feed introduction device 200 that is adapted to deliver a feed from a feed source 201 to the side of a reactor 204. In particular, the feed introduction device 200 comprises a first end 202, which is a fluid communication with the feed source 201. The feed introduction device 200 also comprises a second end 203, which is in fluid communication with the reactor 204. The feed introduction device 200 also comprises a deviation zone 205 between the first end 202 and the second end 203. The deviation zone 205 deviates a flow of feed about a deviation angle θ as the feed passes from the first end 202 toward the second end 203. The deviation angle θ preferably is greater than 90 degrees.

In the embodiment illustrated in FIG. 2, the feed introduction device 200 further includes a feed inlet zone 210, which comprises a first distal end 211 and a first proximal end 212. The first distal end 211 is in fluid communication with the feed source 201 and the first proximal end 212 is in fluid communication with the deviation zone 205. As indicated above, for purposes of the present specification and appended claims, the proximal direction, shown by arrow 215, is a direction extending toward grade and the distal direction, shown by arrow 216, is a direction extending away from grade.

The feed introduction device illustrated in FIG. 2 also includes a feed outlet zone 209, which includes a second proximal end 213 and a second distal end 214. The second proximal end 213 is a fluid communication with the deviation zone 205 and the second distal end 214 is in fluid communication with the reactor 204. As shown, the first end 202 of the feed introduction device coincides with the first distal end 211 of the feed inlet zone 210. Similarly, the second end 203 of the feed introduction device 200 coincides with second distal end 214 of the feed outlet zone 209.

The feed introduction device 200 illustrated in FIG. 2 also includes a region of increasing cross sectional area 217. The purpose of the region of increasing cross sectional area 217 is to decrease the superficial velocity of the feed as it passes through the region of increasing cross sectional area 217. Thus, the feed that passes through feed inlet zone 210 travels at a higher superficial velocity than the feed that passes through the deviation zone 205 and the feed outlet zone 209. The higher velocity of the flow of feed in the feed inlet zone 210 will tend to minimize or prevent backflow of catalyst into feed inlet zone 210. Thus, the region of increasing cross sectional area 217 tends to further minimize or eliminate backflow of catalyst particles into the feed source 201.

Although FIG. 2 illustrates the region of increasing cross sectional area 217 as being situated within the feed inlet zone 210, it is contemplated that the region of increasing cross sectional area may be situated within the feed outlet zone 209 and/or within the deviation zone 205. It is further contemplated that the feed introduction device 200 optionally comprises a plurality of regions of increasing cross sectional area. For example, the feed introduction device may include a region of increasing cross sectional area between the feed source 201 and the feed inlet zone 210, between the inlet zone 210 and the deviation zone 205 (as shown), and/or between the deviation zone 205 and the feed outlet zone 209.

The feed introduction device 200 optionally further comprises one or more valves to further reduce or eliminate backflow of catalyst into the feed source 201. As shown, the feed introduction device 200 comprises a valve 219 situated on the feed inlet zone 210. Optionally, the valve is situated on one or more of: the feed inlet zone 210 (as shown), the deviation zone 205 and/or the feed outlet zone 209. The valve optionally is selected from the group consisting of a check valve, a swing check valve, a disk check valve, a tilting disk check valve, a ball check valve and a control valve. If the valve comprises a check valve (any of the above check valve types), as the flow of feed through the feed introduction device 200 decreases, for example during shutdown operations, the check valve 219 closes to ensure that catalyst does not flow back into feed source 201.

As indicated above, the feed introduction device 200 further comprises a deviation zone 205 for deviating the flow of catalyst about a deviation angle θ. The purpose of the deviation zone 205 is to provide a region whereby any backflowing catalyst may settle and thereby be prevented from flowing undesirably back to the feed source 201. Thus, the deviation zone 205 functions in a manner similar to a trap in a sink drain. The deviation zone also is optionally removable from the feed introduction device 200 to facilitate cleaning thereof.

Thus, during shutdown operations, any catalyst that backflows into feed outlet zone 209 and into deviation zone 205 is trapped in the deviation zone 205 rather than backing up into the feed source 201.

Optionally, the deviation zone 205 includes a drain 218, which preferably is operable in order to remove some of the catalyst that is trapped in deviation zone 205 after reactor 204 shutdown. Optionally, a removable cap (not shown) is removably attached to the drain 218. Prior to reactor start up, the cap may be removed, e.g., unscrewed, to facilitate residual catalyst removal. After the residual catalyst has been removed, the removable cap may be reattached to the drain 218, and the flow of feed may be increased to normal operating conditions.

As indicated above, the deviation angle θ preferably is greater than 90 degrees, more preferably greater than 90 degrees and less than 360 degrees, more preferably greater than 130 degrees and less than 170 degrees and most preferably greater than 140 degrees and less than 160 degrees, e.g., about 150 degrees. The deviation angle θ, as indicated above, is the angle about which the flow of feed is deviated in the feed introduction device 200. In FIG. 2, the flow of feed in feed inlet zone 210 travels in a direction generally parallel to first line of symmetry 224. The first line of symmetry 224 is defined by a central axis of the feed inlet zone 210, if the feed inlet zone 210 is formed of a member comprising a central axis or of a centroid line of feed inlet zone 210 if feed inlet zone 210 does not include a central axis. As the feed enters deviation zone 205, the flow of feed is deviated from the direction defined by first line of symmetry 224 to a direction generally parallel with second line of symmetry 225. Second line of symmetry 225 is defined by a central axis of feed outlet zone 209 (if the feed outlet zone 209 comprises a central access), or by a centroid line defined by feed outlet zone 209 if the feed outlet zone 209 does not include a central axis. Thus, the angle about which the feed is deviated as it flows from the feed inlet zone 210 to the feed outlet zone 209 defines deviation angle θ. Ultimately, the feed is directed through feed outlet zone 209 and outlet 208 and into reactor 204.

In one aspect of the invention, the reactor 204 comprises an inner wall 207 and an outer wall 206. The feed introduction device 200 preferably traverses both outer wall 206 and inner wall 207. As shown, the feed introduction device 200 forms a feed introduction angle λ with the outer wall 206 of the reactor 204. Ideally, the feed introduction angle λ ranges from about 15 degrees to about 90 degrees, preferably from about 20 degrees to about 45 degrees, and most preferably from about 25 degrees to about 35 degrees, e.g., about 30 degrees. As illustrated in FIG. 2, the feed outlet zone 209 directs the flow of catalyst in an oblique distal direction as it enters the reactor 204 thereby facilitating the upward (distal) flow of catalyst and feed in reactor 204.

Optionally, the feed introduction device 200 includes a purge gas system, which provides for the ability to introduce a purge gas into the feed introduction device 200 and thereby eliminate any trapped catalyst that is contained in feed introduction device 200. As shown, the purge gas system comprises a purge gas source 223, a purge gas introduction line 226 and one or more derivative purge gas introduction lines 220 A-B. In operation, a purge gas from purge gas source 223 is directed to feed introduction device 200. As shown, the purge gas is directed from the purge gas source 223 through purge gas introduction line 226, which is divided between one or more derivative purge gas introduction lines 220 A-B. As shown, purge gas introduction line 226 is divided between two derivative purge gas introduction lines 220 A-B. It is contemplated, however, that the purge gas introduction line 226 may be divided between many more derivative purge gas introduction lines. Flow control device 222 controls the flow of the purge gas through purge gas introduction line 226. The individual flow of purge gas through derivative purge gas introduction lines 220 A-B may be controlled by flow control devices 221 A-B. The type of purge gas utilized in the purge gas introduction system may very widely but preferably is selected from the group consisting of steam, air, nitrogen and argon. Preferably, the purge gas comprises steam and/or an inert gas, and the supply of the purge gas is maintained despite any decrease in the flow of feed. During reactor startup, it may be desired to introduce a blast of purge gas into the feed introduction device 200 in order to evacuate any trapped catalyst from the deviation zone 205.

Figure 4:
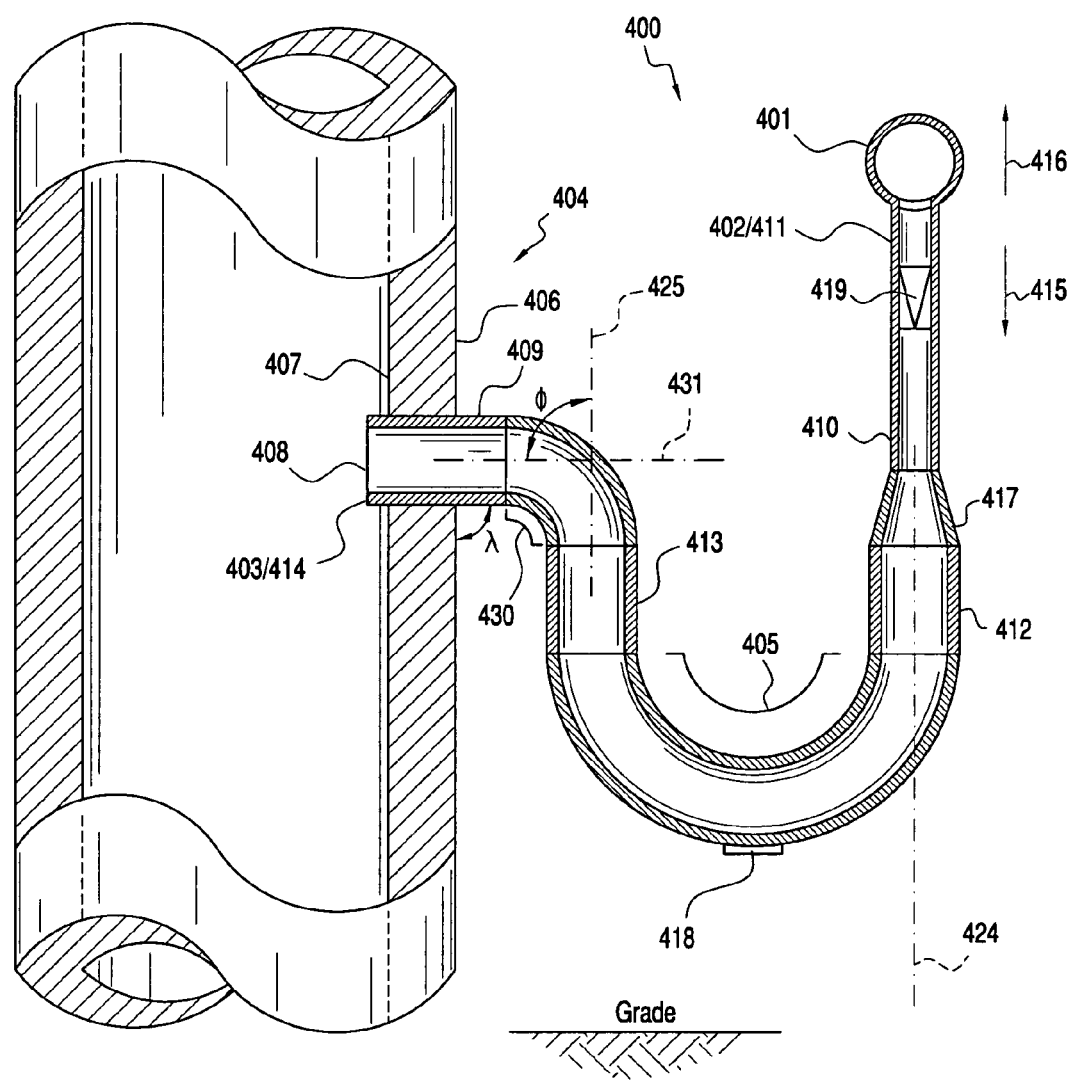
FIG. 4 presents a feed introduction device according to another embodiment of the present invention.

FIG. 4 illustrates a feed introduction device according to another embodiment of the present invention. This figure illustrates that the deviation angle of the feed introduction device may be independent of the feed introduction angle.

Specifically, FIG. 4 illustrates a feed introduction device 400 that is adapted to deliver a feed from a feed source 401 to the side of a reactor 404. In particular, the feed introduction device 400 comprises a first end 402, which is a fluid communication with the feed source 401. The feed introduction device 400 also comprises a second end 403, which is in fluid communication with the reactor 404. The feed introduction device 400 also comprises a first deviation zone 405 between the first end 402 and the second end 403. The first deviation zone 405 deviates a flow of feed about a first deviation angle as the feed passes from the first end 402 toward the second end 403. As shown, the first deviation angle is about 180 degrees.

In the embodiment illustrated in FIG. 4, the feed introduction device 400 further includes a feed inlet zone 410, which comprises a first distal end 411 and a first proximal end 412. The first distal end 411 is in fluid communication with the feed source 401 and the first proximal end 412 is in fluid communication with a first deviation zone 405. As indicated above, the proximal direction, shown by arrow 415, is a direction extending toward grade and the distal direction, shown by arrow 416, is a direction extending away from grade.

The feed introduction device illustrated in FIG. 4 also includes a feed outlet zone 409, which includes a second proximal end 413 and a second distal end 414. The second proximal end 413 is a fluid communication with the first deviation zone 405 and the second distal end 414 is in fluid communication with the reactor 404. As shown, the first end 402 of the feed introduction device coincides with the first distal end 411 of the feed inlet zone 410. Similarly, the second end 403 of the feed introduction device 400 coincides with second distal end 414 of the feed outlet zone 409.

In one aspect of the invention, the reactor 404 comprises an inner wall 407 and an outer wall 406. The feed introduction device 400 preferably traverses both outer wall 406 and inner wall 407. As shown, the feed introduction device 400 forms a feed introduction angle λ with the outer wall 406 of the reactor 404.

As indicated above, the feed introduction device 400 further comprises a first deviation zone 405 for deviating the flow of catalyst about a first deviation angle, here about 180 degrees. The purpose of the first deviation zone 405 is to provide a region whereby any backflowing catalyst may settle and thereby be prevented from flowing undesirably back to the feed source 401. Thus, the first deviation zone 405 functions in a manner similar to a trap in a sink drain. The deviation zone also is optionally removable from the feed introduction device 400 to facilitate cleaning thereof. Thus, during shutdown operations, any catalyst that backflows into feed outlet zone 409 and into deviation zone 405 is trapped in the first deviation zone 405 rather than backing up into the feed source 401.

The first deviation angle, as indicated above, is the angle about which the flow of feed is deviated in the first deviation zone 400. In FIG. 4, the flow of feed in feed inlet zone 410 travels in a direction generally parallel to a first line of symmetry 424. The first line of symmetry 424 is defined by a central axis of the feed inlet zone 410, if the feed inlet zone 410 is formed of a member comprising a central axis or of a centroid line of feed inlet zone 410 if feed inlet zone 410 does not include a central axis. As the feed enters first deviation zone 405, the flow of feed is deviated from the direction defined by first line of symmetry 424 to a direction generally parallel with second line of symmetry 425. Second line of symmetry 425 is defined by a central axis of the second proximal end 413 of feed outlet zone 409 (if the second proximal end 413 comprises a central access), or by a centroid line defined by the second proximal end 413 of feed outlet zone 409 if the second proximal end 413 does not include a central axis. Thus, the angle about which the feed is deviated as it flows from the feed inlet zone 410 to the feed outlet zone 409 defines the first deviation angle. Ultimately, the feed is directed through feed outlet zone 409 (including the second deviation zone 430), through outlet 408 and into reactor 404.

As shown, the feed introduction device 400 (specifically, the feed outlet zone 409) also comprises a second deviation zone 430, which deviates the flow of feed as it passes through the feed outlet zone 409. Specifically, the second deviation zone 430 deviates a flow of feed about a second deviation angle φ as the feed passes through the feed outlet zone 409. Upon entering the second proximal end 413 of feed outlet zone 409, the flow of feed travels in a direction generally parallel to the second line of symmetry 425. As the feed enters second deviation zone 430, the flow of feed is deviated from the direction defined by second line of symmetry 425 to a direction generally parallel with third line of symmetry 431. Third line of symmetry 430 is defined by a central axis of the second distal end 414 of feed outlet zone 409 (if the second distal end 414 comprises a central access), or by a centroid line defined by the second distal end 414 of feed outlet zone 409 if the second distal end 414 does not include a central axis. Thus, the angle about which the feed is deviated as it flows from the second proximal end 413 to the second distal end 414 of the feed outlet zone 409 defines the second deviation angle φ. Ultimately, the feed is directed through outlet 408 and into reactor 404.

The purpose of the second deviation zone 430 is to provide a desirable feed introduction angle λ that is independent of the first deviation angle. As shown, the second deviation angle φ and the feed introduction angle λ are both about 90 degrees. The second deviation angle φ may vary widely depending on the first deviation angle and the desired feed introduction angle λ. Optionally, the second deviation angle φ is greater than 0 degrees and less than about 180 degrees, greater than about 20 degrees and less than about 45 degrees, or greater than 25 degrees and less than 35 degrees, e.g., about 30 degrees.

Optionally, the first deviation zone 405 includes a drain 418, which preferably is operable in order to remove some of the catalyst that is trapped in the first deviation zone 405 after reactor shutdown. Optionally, a removable cap (not shown) is removably attached to the drain 418. Prior to reactor start up, the cap may be removed, e.g., unscrewed, to facilitate residual catalyst removal. After the residual catalyst has been removed, the removable cap may be reattached to the drain 418, and the flow of feed may be increased to normal operating conditions.

The feed introduction device 400 illustrated in FIG. 4 also includes a region of increasing cross sectional area 417. The region of increasing cross sectional area functions in substantially the same manner as the region of increasing cross sectional area 217 of FIG. 2, discussed above. The region of increasing cross sectional area 417 illustrated in FIG. 4, however, is situated within the feed inlet zone 410. It is contemplated that the region of increasing cross sectional area 417 may be situated within the feed outlet zone 409, within the first deviation zone 405 or within the second deviation zone 430. It is further contemplated that the feed introduction device 400 optionally comprises a plurality of regions of increasing cross sectional area.

The feed introduction device 400 optionally further comprises one or more valves to further reduce or eliminate backflow of catalyst into the feed source 401. As shown, the feed introduction device 400 comprises a valve 419 situated on the feed inlet zone 410. Optionally, the valve is situated on one or more of: the feed inlet zone 410 (as shown), the first deviation zone 405, the second deviation zone 430, and/or the feed outlet zone 409. The valve optionally is selected from the group consisting of a check valve, a swing check valve, a disk check valve, a tilting disk check valve, a ball check valve and a control valve. If the valve comprises a check valve (any of the above check valve types), as the flow of feed through the feed introduction device 400 decreases, for example during shutdown operations, the check valve 419 closes to ensure that catalyst does not flow back into feed source 401.

It is important to note that if the feed introduction device comprises a plurality of deviation zones, as shown in FIG. 4, then each deviation angle is independent of the other deviation angle(s). Thus, although the second deviation zone deviates the flow of feed in a direction opposite the first deviation zone, neither the first deviation angle nor the second deviation angle should be considered a "negative" angle. Further, the individual deviation angles should not be added or subtracted from one another to determine a "net" deviation angle for the feed introduction device. Thus, the feed introduction device 400 illustrated in FIG. 4 comprises both a (first) deviation angle of 180 degrees and a (second) deviation angle of about 90 degrees—not a single net deviation angle of 180−90=90 degrees.

Optionally, the feed introduction device 400 includes a purge gas system, which is not shown in FIG. 4, but would operate in a manner similar to the embodiment disclosed in FIG. 2.

C. Processes for Using the Feed Introduction Device

In another embodiment, the invention is directed to a process for introducing a feed into a reactor from a feed introduction device having a first end, a second end and deviation zone. The process includes a step of receiving a flow of feed into the first end of the feed introduction device from a feed source. The flow of feed in the (first) deviation zone is deviated about a (first) deviation angle from the first end toward the second end. The (first) deviation angle is greater than 90 degrees, optionally greater than 90 degrees and less than 360 degrees, more preferably greater than 130 degrees and less than 170 degrees, and most preferably greater than 140 degrees and less than 160 degrees, e.g., about 150 degrees. The feed from the second end of the feed introduction device is released into the reactor.

In this embodiment, as discussed above, the reactor optionally has an outer wall and the feed introduction device forms a feed introduction angle with the outer wall from about 15 degrees to about 90 degrees, preferably from about 20 degrees to about 45 degrees, and most preferably from about 25 degrees to about 35 degrees, e.g., about 30 degrees. In one embodiment, the feed introduction device further comprises a feed outlet zone having a second proximal end and a second distal end, the process further including the step of directing the flow of feed through the feed outlet zone between the deviating step and the releasing step. Additionally or alternatively, the feed introduction device further includes a feed inlet zone having a first distal end and a first proximal end, the process further including the step of directing the flow of feed through the feed inlet zone between the receiving step and the deviating step. Optionally, the feed inlet zone extends in a direction substantially perpendicular to grade.

Optionally, the feed outlet zone comprises a second deviation zone, discussed above. In this embodiment, the inventive process further comprises a step of deviating the flow of catalyst about a second deviation angle as the flow of feed passes through the feed outlet zone. The second deviation angle may vary widely depending on the first deviation angle and the desired feed introduction angle. Optionally, the second deviation angle is greater than 0 degrees and less than about 180 degrees, greater than about 20 degrees and less than about 45 degrees, or greater than 25 degrees and less than 35 degrees, e.g., about 30 degrees. Ultimately, the feed is released into the reactor.

Optionally, as discussed in more detail above, the feed introduction device further includes a region of increasing cross sectional area with respect to the direction the feed normally flows through the feed introduction device. The region of increasing cross sectional area preferably increases from a first cross sectional area to a second cross sectional area, the ratio of the second cross sectional area to the first cross sectional area being greater than 1.0, more preferably greater than about 2.0, and most preferably greater than about 4.0. In this embodiment, the process includes the step of decreasing the feed superficial velocity from a first superficial velocity to a second superficial velocity as the feed passes through the region of increasing cross sectional area.

In this embodiment, the flow of feed upstream of the region of increasing cross sectional area has a first superficial velocity and the flow of feed downstream of the region of increasing cross sectional area has a second superficial velocity, which is less than the first superficial velocity. In one embodiment, the flow of feed has a first superficial velocity in the feed inlet zone and a second superficial velocity in the feed outlet zone, the second superficial velocity being less than the first superficial velocity. In this latter embodiment, the region of increasing cross sectional area optionally is situated between the feed inlet zone and the feed outlet zone, although it is contemplated that the region of increasing cross sectional area may be situated within the feed inlet zone and/or the feed outlet zone.

Optionally, as discussed above, the feed introduction device further includes a valve to minimize back flow of catalyst into the feed source. The optional valve may be situated on one or more of: the feed inlet zone, the deviation zone and/or the feed outlet zone. The valve optionally is selected of the group consisting of a check valve, a swing check valve, a lift check valve, a tilting disk check valve, a ball check valve and a control valve. If the valve comprises a check valve (any of the above check valve types), as the flow of the feedstock decreases, for example during reactor shutdown, the pressure of the feedstock against the check valve will decrease, causing the check valve to close. The closing of the check valve preferably further minimizes the backflow of catalyst into the feed source. Thus, the process of the present invention optionally includes a step of closing a valve as the feed pressure decreases below a predetermined level, e.g., during reactor shut down. Conversely, the inventive process optionally includes a step of opening a valve as the feed pressure increases above a predetermined level, e.g., during reactor start up.

Optionally, the process of the present invention further includes the step of monitoring the flow of feed through the feed introduction device with a flow detector situated between the first distal end of the feed inlet zone and the valve. In one embodiment, the process further includes the step of closing the valve, preferably a control valve, responsive to a determination in the monitoring step that the flow of feed has fallen below a predetermined level. Conversely, the process optionally further includes the step of opening the valve responsive to a determination in the monitoring step that the flow of feed has increased above a predetermined level.

Additionally or alternatively, the process further includes the step of opening a purge gas introduction valve to allow purge gas into the feed introduction device. The opening step preferably is responsive to a determination in the optional monitoring step that the flow of feed has fallen below a predetermined level. Conversely, the process optionally further includes the step of closing a purge gas introduction valve to decrease or cease the introduction of the purge gas into the feed introduction device. The closing step preferably is responsive to a determination in the optional monitoring step that the flow of feed has increased above a predetermined level. Optionally, the purge gas is introduced into one or more of: the feed inlet zone, the deviation zone and/or the feed outlet zone.

D. The Oxygenate to Olefin Reaction Process

Ideally, the feed introduction device of the present invention feeds an oxygenate containing feedstock into an oxygenate to olefin (OTO) reactor, although it is contemplated that the feed introduction device may be utilized in any of a variety of different reaction systems. A non-limiting list of possible fluid bed reaction systems in which the feed introduction device and processes for using same can be implemented includes: catalytic cracking, hydroforming, phthalic anhydride, maleic anhydride, Fischer-Tropsch synthesis, vinyl acetate, acrylonitrile, ethylene dichloride, chloromethane, polyethylene, and polypropylene. As used herein, "reaction system" means a system comprising a reactor, optionally a catalyst regenerator, optionally a catalyst cooler and optionally a catalyst stripper. Since the OTO reaction process is preferred, the OTO reaction process will now be described in greater detail.

Typically, molecular sieve catalysts have been used to convert oxygenate compounds to light olefins. Ideally, the molecular sieve catalyst composition comprises an alumina or a silica-alumina catalyst composition. Silicoaluminophosphate (SAPO) molecular sieve catalysts are particularly desirable in such conversion processes, because they are highly selective in the formation of ethylene and propylene. A non-limiting list of preferable SAPO molecular sieve catalyst compositions includes SAPO-17, SAPO-18, SAPO-34, SAPO-35, SAPO-44, the substituted forms thereof, and mixtures thereof. Preferably, the molecular sieve catalyst composition comprises a molecular sieve selected from the group consisting of: SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AEI/CHA intergrowths, metal containing forms thereof, intergrown forms thereof, and mixtures thereof.

The feedstock that is directed to an OTO reaction system optionally contains one or more aliphatic-containing compounds such as alcohols, amines, carbonyl compounds for example aldehydes, ketones and carboxylic acids, ethers, halides, mercaptans, sulfides, and the like, and mixtures thereof. The aliphatic moiety of the aliphatic-containing compounds typically contains from 1 to about 50 carbon atoms, preferably from 1 to 20 carbon atoms, more preferably from 1 to 10 carbon atoms, and more preferably from 1 to 4 carbon atoms, and most preferably methanol.

Non-limiting examples of aliphatic-containing compounds include: alcohols such as methanol and ethanol, alkyl-mercaptans such as methyl mercaptan and ethyl mercaptan, alkyl-sulfides such as methyl sulfide, alkyl-amines such as methyl amine, alkyl-ethers such as DME, diethyl ether and methylethyl ether, alkyl-halides such as methyl chloride and ethyl chloride, alkyl ketones such as dimethyl ketone, alkyl-aldehydes such as formaldehyde and acetaldehyde, and various acids such as acetic acid.

In a preferred embodiment of the process of the invention, the feedstock contains one or more organic compounds containing at least one oxygen atom. In the most preferred embodiment of the process of invention, the oxygenate in the feedstock comprises one or more alcohols, preferably aliphatic alcohols where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, DME, diethyl ether, di-isopropyl ether, formaldehyde, dimethyl carbonate, dimethyl ketone, acetic acid, and mixtures thereof. In the most preferred embodiment, the feedstock comprises one or more of methanol, ethanol, DME, diethyl ether or a combination thereof.

The various feedstocks discussed above are converted primarily into one or more olefins. The olefins or olefin monomers produced from the feedstock typically have from 2 to 30 carbon atoms, preferably 2 to 8 carbon atoms, more preferably 2 to 6 carbon atoms, still more preferably 2 to 4 carbons atoms, and most preferably ethylene and/or propylene.

Non-limiting examples of olefin monomer(s) include ethylene, propylene, butene-1, pentene-1, 4-methyl-pentene-1, hexene-1, octene-1 and decene-1, preferably ethylene, propylene, butene-1, pentene-1, 4-methyl-pentene-1, hexene-1, octene-1 and isomers thereof. Other olefin monomers include unsaturated monomers, diolefins having 4 to 18 carbon atoms, conjugated or nonconjugated dienes, polyenes, vinyl monomers and cyclic olefins.

In a preferred embodiment, the feedstock, which ideally contains methanol, is converted in the presence of a molecular sieve catalyst composition into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The most preferred process is generally referred to as an oxygenate-to-olefins (OTO) reaction process. In an OTO process, typically an oxygenated feedstock, most preferably a methanol- and ethanol-containing feedstock, is converted in the presence of a molecular sieve catalyst composition into one or more olefins, preferably and predominantly, ethylene and/or propylene, referred to herein as light olefins.

The feedstock, in one embodiment, contains one or more diluents, typically used to reduce the concentration of the feedstock. The diluents are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred. In other embodiments, the feedstock does not contain any diluent.

The diluent may be used either in a liquid or a vapor form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In one embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition of the invention, is carried out in a reaction process in a reactor, where the process is a fixed bed process, a fluidized bed process (includes a turbulent bed process), preferably a continuous fluidized bed process, and most preferably a continuous high velocity fluidized bed process.

The reaction processes can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and Fluidization Engineering, D. Kunii and O. Levenspiel, Robert E. Krieger Publishing Company, New York, N.Y. 1977, which are all herein fully incorporated by reference.

The preferred reactor type are riser reactors generally described in Riser Reactor, Fluidization and Fluid-Particle Systems, pages 48 to 59, F. A. Zenz and D. F. Othmer, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which are all herein fully incorporated by reference.

In one embodiment, the amount of liquid feedstock fed separately or jointly with a vapor feedstock, to a reactor system is in the range of from 0.1 weight percent to about 85 weight percent, preferably from about 1 weight percent to about 75 weight percent, more preferably from about 5 weight percent to about 65 weight percent based on the total weight of the feedstock including any diluent contained therein. The liquid and vapor feedstocks are preferably the same composition, or contain varying proportions of the same or different feedstock with the same or different diluent.

The conversion temperature employed in the conversion process, specifically within the reactor system, is in the range of from about 392° F. (200° C.) to about 1832° F. (1000° C.), preferably from about 482° F. (250° C.) to about 1472° F. (800° C.), more preferably from about 482° F. (250° C.) to about 1382° F. (750° C.), yet more preferably from about 572° F. (300° C.) to about 1202° F. (650° C.), yet even more preferably from about 662° F. (350° C.) to about 1112° F. (600° C.) most preferably from about 662° F. (350° C.) to about 1022° F. (550° C.).

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kPaa to about 5 MPaa, preferably from about 5 kPaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidized state within a reactor.

Typically, the WHSV ranges from about 1 hr-1 to about 5000 hr-1, preferably from about 2 hr-1 to about 3000 hr-1, more preferably from about 5 hr-1 to about 1500 hr-1, and most preferably from about 10 hr-1 to about 1000 hr-1. In one preferred embodiment, the WHSV is greater than 20 hr-1, preferably the WHSV for conversion of a feedstock containing methanol, DME, or both, is in the range of from about 20 hr-1 to about 300 hr-1.

The superficial gas velocity (SGV) of the feedstock including diluent and reaction products within the reactor is preferably sufficient to fluidize the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec. A SGV of from about 15 ft/sec (5 m/s) to about 60 ft/sec (18 m/s) is preferred. See, for example, U.S. patent application Ser. No. 09/708,753, filed Nov. 8, 2000, which is herein incorporated by reference.

Figure 3:
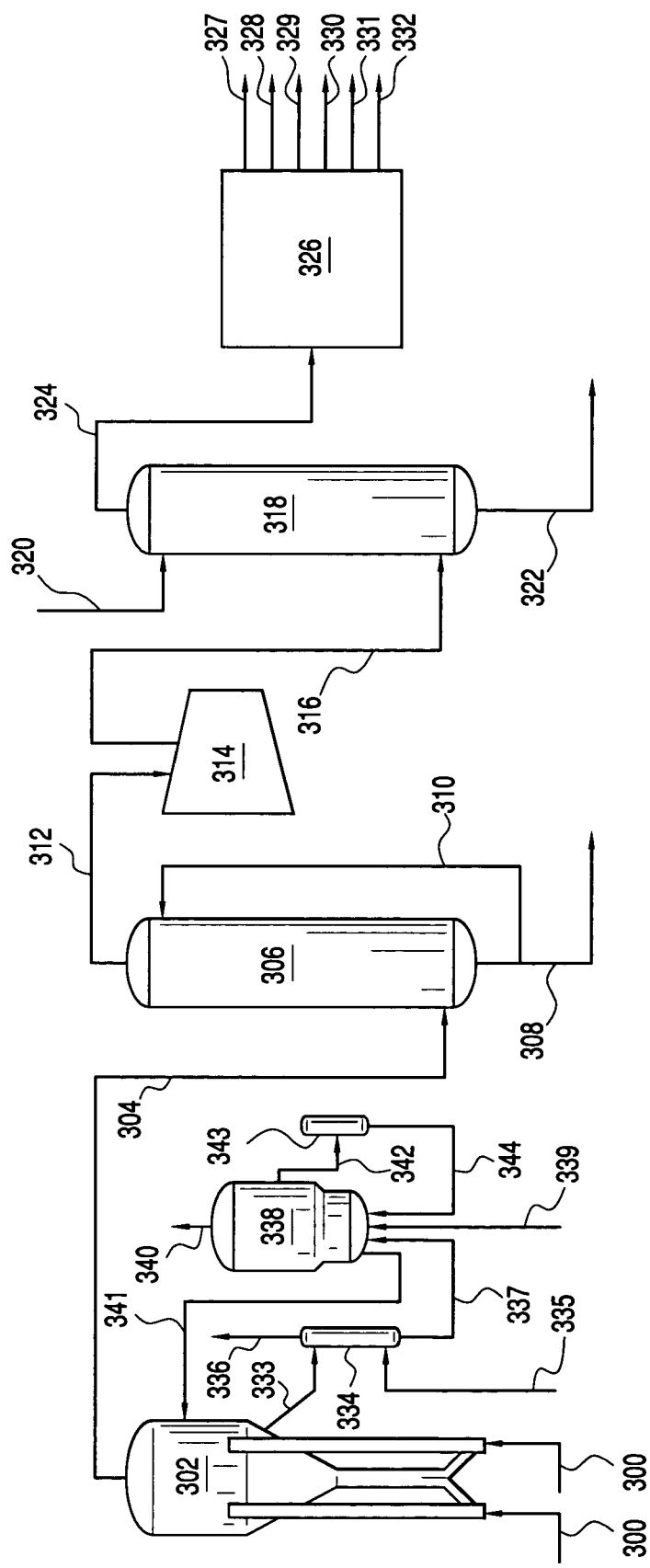
FIG. 3 presents a flow diagram illustrating an oxygenate to olefin reaction unit and an effluent processing system.

FIG. 3 shows an exemplary OTO reaction system. In the figure, an oxygenate such as methanol is directed through lines 300 to an OTO fluidized reactor 302 wherein the oxygenate is converted to light olefins and various by-products which are yielded from the fluidized reactor 302 in an olefin-containing stream in line 304. The olefin-containing stream in line 304 optionally comprises methane, ethylene, ethane, propylene, propane, various oxygenate byproducts, C4+ olefins, water and hydrocarbon components. The olefin-containing stream in line 304 is directed to a quench unit or quench tower 306 wherein the olefin-containing stream in line 304 is cooled and water and other readily condensable components are condensed.

The condensed components, which comprise water, are withdrawn from the quench tower 306 through a bottoms line 308. A portion of the condensed components are recycled through a line 310 back to the top of the quench tower 306. The components in line 310 preferably are cooled in a cooling unit, e.g., heat exchanger (not shown), so as to provide a cooling medium to cool the components in quench tower 306.

An olefin-containing vapor is yielded from the quench tower 306 through overhead stream 312. The olefin-containing vapor is compressed in one or more compressors 314 and the resulting compressed olefin-containing stream is optionally passed through line 316 to a water absorption unit 318. Methanol is preferably used as the water absorbent, and is fed to the top portion of the water absorption unit 318 through line 320. Methanol and entrained water, as well as some oxygenates, are separated as a bottoms stream through line 322. The light olefins are recovered through overhead line 324. Optionally, the light olefins are sent to an additional compressor or compressors (not shown), and then are input to a separation system 326, which optionally comprises one or more separation units such as distillation columns, absorption units, and/or adsorption units.

The separation system 326 separates the components contained in the overhead line 324. Thus, separation system 326 forms a light ends stream 327, optionally comprising methane, hydrogen and/or carbon monoxide; an ethylene-containing stream 328 comprising mostly ethylene; an ethane-containing stream 329 comprising mostly ethane; a propylene-containing stream 330 comprising mostly propylene; a propane-containing stream 331 comprising mostly propane; and one or more byproduct streams, shown as line 332, comprising one or more of the oxygenate byproducts, provided above, heavy olefins, heavy paraffins, and/or absorption mediums utilized in the separation process. Separation processes that may be utilized to form these streams are well-known and are described, for example, in pending U.S. patent application Ser. Nos. 10/124,859 filed Apr. 18, 2002; 10/125,138 filed Apr. 18, 2002; 10/383,204 filed Mar. 6, 2003; and 10/635,410 filed Aug. 6, 2003, the entireties of which are incorporated herein by reference.

FIG. 3 also illustrates a catalyst regeneration system, which is in fluid communication with fluidized reactor 302. As shown, at least a portion of the catalyst compositions contained in fluidized reactor 302 are withdrawn and transported, preferably in a fluidized manner, in conduit 333 from the fluidized reactor 302 to a catalyst stripper 334. In the catalyst stripper 334, the catalyst compositions contact a stripping medium, e.g., steam and/or nitrogen, under conditions effective to remove interstitial hydrocarbons from the molecular sieve catalyst compositions. As shown, stripping medium is introduced into catalyst stripper 334 through line 335, and the resulting stripped stream 336 is released from catalyst stripper 334. Optionally, all or a portion of stripped stream 336 is directed back to fluidized reactor 302.

During contacting of the oxygenate feedstock with the molecular sieve catalyst composition in the fluidized reactor 302, the molecular sieve catalyst composition may become at least partially deactivated. That is, the molecular sieve catalyst composition becomes at least partially coked. In order to reactivate the molecular sieve catalyst composition, the catalyst composition preferably is directed to a catalyst regenerator 338. As shown, the stripped catalyst composition is transported, preferably in the fluidized manner, from catalyst stripper 334 to catalyst regenerator 338 in conduit 337. Preferably, the stripped catalyst composition is transported in a fluidized manner through conduit 337.

In catalyst regenerator 338, the stripped catalyst composition contacts a regeneration medium, preferably comprising oxygen, under conditions effective (preferably including heating the coked catalyst) to at least partially regenerate the catalyst composition contained therein. As shown, the regeneration medium is introduced into the catalyst regenerator 338 through line 339, and the resulting regenerated catalyst compositions are ultimately transported, preferably in a fluidized manner, from catalyst regenerator 338 back to the fluidized reactor 302 through conduit 341. The gaseous combustion products are released from the catalyst regenerator 338 through flue gas stream 340. In another embodiment, not shown, the regenerated catalyst composition additionally or alternatively is directed, optionally in a fluidized manner, from the catalyst regenerator 338 to one or more of the fluidized reactor 302 and/or the catalyst stripper 334. In one embodiment, not shown, a portion of the catalyst composition in the reaction system is transported directly, e.g., without first passing through the catalyst stripper 334, optionally in a fluidized manner, from the fluidized reactor 302 to the catalyst regenerator 338.

As the catalyst compositions contact the regeneration medium in catalyst regenerator 338, the temperature of the catalyst composition may increase due to the exothermic nature of the regeneration process. As a result, it may be desirable to control the temperature of the catalyst composition by directing at least a portion of the catalyst composition from the catalyst regenerator 338 to a catalyst cooler 343. As shown, the catalyst composition is transported in a fluidized manner from catalyst regenerator 338 to the catalyst cooler 343 through conduit 342. The resulting cooled catalyst composition is transported, preferably in a fluidized manner from catalyst cooler 343 back to the catalyst regenerator 338 through conduit 344. In another embodiment, not shown, the cooled catalyst composition additionally or alternatively is directed, optionally in a fluidized manner, from the catalyst cooler 343 to one or more of the fluidized reactor 302 and/or the catalyst stripper 334.

Having now fully described the invention, it will be appreciated by those skilled in the art that the invention may be performed within a wide range of perimeters within what is claimed, without departing from the spirit and scope of the present invention.

We claim:

1. A process for introducing a feed comprising one or more aliphatic-containing compounds into a fluid bed reactor from a feed introduction device having a first end, a second end and a deviation zone, wherein the process comprises the steps of:
   (a) receiving a flow of the feed into the first end of the feed introduction device from a feed source;

(b) deviating the flow of feed in the deviation zone about a deviation angle from the first end toward the second end, wherein the deviation angle is greater than 90 degrees; and (c) releasing the feed from the second end of the feed introduction device and into the fluid bed reactor to contact a molecular sieve catalyst, wherein the molecular sieve catalyst flows through the fluid bed reactor at a weight hourly space velocity from $1\ hr^{-1}$ to $5000\ hr^{-1}$ to maintain the catalyst in a fluidized state in the fluid bed reactor, and wherein the feedstock released into the fluid bed reactor, including diluent and reaction products within the reactor, flows through the fluid bed reactor at a superficial gas velocity of at least 0.1 meter per second to fluidize the molecular sieve catalyst within the reaction zone.

2. The process of claim 1, wherein the reactor has an outer wall and the feed introduction device forms a feed introduction angle with the outer wall of from about 15 degrees to about 90 degrees.

3. The process of claim 2, wherein the feed introduction angle is from about 20 degrees to about 45 degrees.

4. The process of claim 3, wherein the feed introduction angle is from about 25 degrees to about 35 degrees.

5. The process of claim 1, wherein the deviation angle is greater than 90 degrees and less than 360 degrees.

6. The process of claim 5, wherein the deviation angle is greater than 130 degrees and less than 170 degrees.

7. The process of claim 6, wherein the deviation angle is greater than 140 degrees and less than 160-degrees.

8. The process of claim 1, wherein the feed source comprises a feed header.

9. The process of claim 1, wherein the feed introduction device is formed of a substantially tubular member that curves about the deviation angle.

10. The process of claim 1, wherein the feed introduction device further comprises a feed outlet zone having a second proximal end and a second distal end, the process further comprising the step of:

(d) directing the flow of feed through the feed outlet zone between steps (b) and (c).

11. The process of claim 10, wherein the feed outlet zone comprises a second deviation zone and the process further comprises the step of:

(e) deviating the flow of feed about a second deviation angle as it passes through the second deviation zone.

12. The process of claim 1, wherein the feed introduction device further comprises a feed inlet zone having a first distal end and a first proximal end, the process further comprising the step of:

(d) directing the flow of feed through the feed inlet zone between steps (a) and (b).

13. The process of claim 12, wherein the feed inlet zone extends in a direction substantially perpendicular to grade.

14. The process of claim 12, wherein the feed introduction device further comprises a feed outlet zone having a second proximal end and a second distal end, the process further comprising the step of:

(e) directing the flow of feed through the feed outlet zone between steps (b) and (c).

15. The process of claim 14, wherein the feed introduction device has a region of increasing cross sectional area, with respect to the direction the feed normally flows through the feed introduction device.

16. The process of claim 15, wherein the region of increasing cross sectional area increases from a first cross sectional area to a second cross sectional area, the ratio of the second cross sectional area to the first cross sectional area being greater than 1.0.

17. The process of claim 16, wherein the ratio of the second cross sectional area to the first cross sectional area is greater than about 2.0.

18. The process of claim 17, wherein the ratio of the second cross sectional area to the first cross sectional area is greater than about 4.0.

19. The process of claim 14, wherein the flow of feed has a first superficial velocity in the feed inlet zone and a second superficial velocity in the feed outlet zone, the second superficial velocity being less than the first superficial velocity.

20. The process of claim 14, wherein backflow of catalyst into the feed source is minimized by a valve.

21. The process of claim 20, wherein the valve is situated on one or more of: the feed inlet zone, the deviation zone or the feed outlet zone.

22. The process of claim 20, wherein the valve is selected from the group consisting of a check valve, a swing check valve, a lift check valve, a tilting disk check valve, a ball check valve and a control valve.

23. The process of claim 20, wherein the process further comprises the step of:

(f) monitoring the flow of feed through the feed introduction device with a flow detector situated between the first distal end of the feed inlet zone and the valve.

24. The process of claim 23, wherein the process further comprises the step of:

(g) closing the valve responsive to a determination in step (f) that the flow of feed has fallen below a predetermined level.

25. The process of claim 23, wherein the process further comprises the step of:

(g) opening a purge gas introduction valve to allow purge gas into the feed introduction device.

26. The process of claim 25, wherein step (g) is responsive to a determination in step (f) that the flow of feed has fallen below a predetermined level.

27. The process of claim 25, wherein the purge gas is introduced into one or more of: the feed inlet zone, the deviation zone or the feed outlet zone.

28. The process of claim 1, wherein the feed comprises an oxygenate and the reactor comprises an oxygenate to olefin reactor.

29. The process of claim 1, wherein the reactor comprises a fluidized reactor.

* * * * *